United States Patent
Wu et al.

(10) Patent No.: US 7,162,097 B1
(45) Date of Patent: Jan. 9, 2007

(54) METHODS AND APPARATUS FOR TRANSFORM COEFFICIENT FILTERING

(75) Inventors: Fang Wu, San Jose, CA (US); Ke Shen, Sunnyvale, CA (US); Yi Tong Tse, San Jose, CA (US); Sangeeta Ramakrishnan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 559 days.

(21) Appl. No.: 09/867,966

(22) Filed: May 29, 2001

(51) Int. Cl.
*G06K 9/46* (2006.01)

(52) U.S. Cl. .................................................. 382/250

(58) Field of Classification Search ........ 382/232–253, 382/260–266; 375/240–240.26, 240.29
See application file for complete search history.

(56) References Cited

U.S. PATENT DOCUMENTS

| | | | |
|---|---|---|---|
| 5,005,076 A | | 4/1991 | Stroppina et al. |
| 5,907,374 A | * | 5/1999 | Liu ....................... 375/240.26 |
| 6,002,801 A | | 12/1999 | Strongin et al. |
| 6,181,711 B1 | | 1/2001 | Zhang et al. |
| 6,236,749 B1 | | 5/2001 | Satonaka et al. |
| 6,335,990 B1 | | 1/2002 | Chen et al. |
| 6,359,999 B1 | | 3/2002 | Moriwaki et al. |
| 6,412,112 B1 | * | 6/2002 | Barrett et al. ............... 725/152 |
| 6,516,096 B1 | | 2/2003 | Yokose et al. |
| 6,553,148 B1 | * | 4/2003 | Zeng et al. .................. 382/240 |
| 6,556,624 B1 | | 4/2003 | Orchard et al. |
| 6,661,923 B1 | * | 12/2003 | Koike et al. ................. 382/232 |
| 6,687,296 B1 | * | 2/2004 | Sato et al. ............. 375/240.12 |
| 6,763,070 B1 | * | 7/2004 | Lee .......................... 375/240.2 |

OTHER PUBLICATIONS

Office Action dated Jun. 15, 2005, U.S. Appl. No. 09/867,967.
Office Action dated Jun. 20, 2003, U.S. Appl. No. 09/870,177.

(Continued)

*Primary Examiner*—Ishrat Sherali
(74) *Attorney, Agent, or Firm*—Beyer Weaver & Thomas, LLP

(57) ABSTRACT

According to the present invention, methods and apparatus for filtering transform coefficients are provided. Transform coefficients associated with an input bit sequence can be zeroed to provide modified transform coefficients associated with an output bit sequence. The transform coefficients may represent information in a portion of data such as a video frame, a picture, or an audio stream. In one example, the transform coefficients are DCT coefficients of an MPEG-2 video sequence. The transform coefficients are filtered to provide modified transform coefficients associated with an output bit sequence. The output bit sequence is a rescaled version of the input bit sequence.

44 Claims, 11 Drawing Sheets

OTHER PUBLICATIONS

U.S. Appl. No. 09/608,128, entitled "Methods and Apparatus for Bandwidth Scalable Transmission of Compressed Video Data through Resolution Conversion", inventor(s): Zhang, filed Jun 30, 2000.

U.S. Appl. No. 09/766,020, entitled "Methods for Efficient Bandwidth Scaling of Compressed Video Data", inventor(s): Zhang, filed Jan. 18, 2001.

U.S. Appl. No. 09/867,967, entitled "Methods and Apparatus for Updating a Reduction Ratio", inventor(s): Shen, filed May 29, 2001.

G. Keesman, R. Hellinghuizen, F. Hoeksema, G. Heideman, "Transcoding of MPEG bitstreams", Signal Processing: Image Communication, vol. 8 (1996), pp. 481-500.

Brian C. Smith, "A Survey of Compressed Domain Processing Techniques," downloaded from www.uky.edu, Mar. 20, 2001, 10 pages.

Anthony Vero, "MPEG-4 Rate Control for Multiple Video Objects," *IEEE Transactions on Circuits and Systems for Video Technology*, vol. 9, No. 1, Feb. 1999, pp. 186-199.

Shen et al., "Methods and Apparatus for Updating A Reduction Ratio," U.S. Appl. No. 09/867,967, filed May 29, 2001, 55 pages.

Yuen-Wen Lee, "Methods and Apparatus for Selecting a Cut-off Index," U.S. Appl. No. 09/870,177, filed May 29, 2001, 53 pages.

* cited by examiner

METHODS AND APPARATUS FOR TRANSFORM COEFFICIENT FILTERING

CROSS-REFERENCE TO RELATED APPLICATIONS

The present application is related to U.S. patent application Ser. No. 09/876,967 by Shen et al., and titled Methods and Apparatus for Updating a Reduction Ratio and related to U.S. Pat. No. 6,763,070 by Lee et al., and titled Methods and Apparatus for Selecting a Cut-off index, both filed on the same day as the present application. Each of the above patent applications is incorporated herein by reference for all purposes.

BACKGROUND OF THE INVENTION

The present invention relates to rescaling data. More specifically, the present invention relates to filtering data to allow more rate reduction. Still more specifically, the present invention provides techniques for filtering transform coefficients associated with an input data sequence (e.g. an audio segment or a video image) to provide modified transform coefficients associated with a modified output data sequence.

Video data is one particularly relevant form of data that can benefit from improved techniques for changing the associated bandwidth requirements. Video rescaling schemes allow digitized video frames to be represented digitally in an efficient manner. Rescaling digital video makes it practical to transmit the compressed signal by digital channels at a fraction of the bandwidth required to transmit the original signal without compression. Generally, compressing data or further compressing compressed data is referred to herein as rescaling data. International standards have been created on video compression schemes. The standards include MPEG-1, MPEG-2, MPEG-4, H.261, H.262, H.263, H.263+, etc. The standardized compression schemes mostly rely on several key algorithm schemes: motion compensated transform coding (for example, DCT transforms or wavelet/sub-band transforms), quantization of the transform coefficients, and variable length coding (VLC).

The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and reduces bit usage in the compression output stream. The other factor contributing to rescaling is variable length coding (VLC) that represents frequently used symbols using code words. In general, the number of bits used to represent a given image determines the quality of the decoded picture. The more bits used to represent a given image, the better the image quality. The system that is used to compress digitized video sequence using the above described schemes is called an encoder or encoding system.

More specifically, motion compensation performs differential encoding of frames. Certain frames, such as I-frames in MPEG-2, continue to store the entire image, and are independent of other frames. Intracoded frames, such as B-frames or P-frames in MPEG-2, store motion vectors associated with the movement of particular objects in the frames. The pixel-wise difference between objects is called the error term, which can be stored in P and B frames. In MPEG-2, P-frames reference a single frame while B-frames reference two different frames. Although this allows fairly high reduction ratios, motion compensation is limited when significant changes occur between frames. When significant changes occur between frames in a video sequence, a large number of frames are encoded as reference frames. That is, entire images and not just motion vectors are maintained in a large number of frames. This precludes high reduction ratios. Furthermore, motion compensation can be computationally expensive.

Each frame can be converted to luminance and chrominance components. As will be appreciated by one of skill in the art, the human eye is more sensitive to the luminance than to the chrominance of an image. In MPEG-2, luminance and chrominance frames are divided into 8×8 pixel blocks. The 8×8 pixel blocks are transformed using a discrete cosine transform (DCT) and scanned to create a DCT coefficient vector. Quantization involves dividing the DCT coefficients by a scaling factor. The divided coefficients can be rounded to the nearest integer. After quantization, some of the quantized elements become zero. The many levels represented by the transform coefficients are reduced to a smaller number of levels after quantization. With fewer levels represented, more sequences of numbers are similar. For example, the sequence 4.9 4.1 2.2 1.9 after division by two and rounding becomes 2 2 1 1. As will be described below, a sequence with more similar numbers can more easily be encoded using VLC. However, quantization is an irreversible process and hence introduces loss of information associated with the original frame or image.

VLC encoding takes the most common long sequences of numbers of bits and replaces them with a shorter sequence of numbers or bits. Data containing fewer common sequences take more bits to encode.

Currently available compression techniques for rescaling data (e.g. video or audio) are limited in their ability to effectively compress data sequences for transmission across networks or storage on computer readable media. The available techniques also have significant limitations with respect loss, computational expense, and delay. Various techniques for reducing the bit rate of compressed data sequences including audio and video streams are being developed. Some of the more promising approaches are described in U.S. Pat. No. 6,181,711 titled System And Method For Transporting A Compressed Video And Data Bitstream Over A Communication Channel. Other approaches are described in U.S. patent application Ser. No. 09/608,128 Methods And Apparatus For Bandwidth Scalable Transmission Of Compressed Video Data Through Resolution Conversion and U.S. patent application Ser. No. 09/766,020 titled Methods For Efficient Bandwidth and U.S. patent application Ser. No. 08/985,377 titled System And Method For Spatial Temporal-Filtering For Improving Compressed Digital Video Scaling Of Compressed Video Data. Each of these references is assigned to the assignee of this invention and is incorporated herein by reference for all purposes. It is still desirable to provide additional techniques for rescaling data that improve upon the limitations of the prior art.

SUMMARY OF THE INVENTION

According to the present invention, methods and apparatus for filtering transform coefficients are provided. Transform coefficients associated with an input bit sequence can be zeroed to provide modified transform coefficients associated with an output bit sequence. The transform coefficients may represent information in a portion of data such as a video frame, a picture, or an audio stream. In one example, the transform coefficients are DCT coefficients of an MPEG-2 video sequence. The transform coefficients are filtered to provide modified transform coefficients associated with an output bit sequence. The output bit sequence is a rescaled version of the input bit sequence.

One aspect of the invention provides a method of reducing the bit rate of a video bitstream to meet bandwidth constraints. Transform coefficients representing video content in a frame or a portion of frame of the video bitstream are identified. Selected transform coefficients are filtered from the video bitstream to thereby reduce the bit rate of the video bitstream.

The filtering of the selected transform coefficients can use mechanisms such as a cut-off index, a matrix or vector having ones and zeros, or a matrix or vector having threshold values. A wide variety of possible filters are contemplated, such as low pass, band pass, and high pass filters.

According to another aspect of the invention, a method of filtering transform coefficients associated with an input bitstream is provided. Transform coefficients associated with an input bitstream are identified. Transform coefficients are selected for filtering to provide modified transform coefficients. An output bitstream is generated, wherein the output bitstream associated with modified transform coefficients uses less bandwidth than the input bitstream associated with the transform coefficients.

Identifying transform coefficients may include performing variable length decoding on the input bitstream, reading the transform coefficients from a file, or performing a transform operation on video or audio data.

Yet another aspect of the invention provides an apparatus for filtering transform coefficients associated with input bits to provide modified transform coefficients associated with output bits. The apparatus includes an input interface for receiving transform coefficients associated with input bits, a filtering stage for coupled to the input interface, wherein the filtering stage selects transform coefficients for filtering, and an output interface coupled with the filtering stage for providing modified transform coefficients associated with output bits, wherein the number of output bits is less than the number of input bits.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

DETAILED DESCRIPTION OF SPECIFIC EMBODIMENTS

The present invention generally relates to data compression. Data compression techniques are described generally in *The Data Compression Book*, by Mark Nelson (ISBN: 1558514341), the entirety of which is hereby incorporated by reference for all purposes.

Many techniques for data compression are currently available. One particularly relevant technique for data compression is MPEG-2. MPEG-2 uses motion compensation, discrete cosine transforms, quantization, and variable length coding to rescale video data. Many prior art techniques have focused bit rate reduction and rescaling schemes on quantization, motion compensation, and variable length encoding. The present invention provides techniques for selectively filtering DCT coefficients to efficiently allow video compression to comply with desired reduction ratios while maintaining optimal perceivable image quality.

Figure 1:
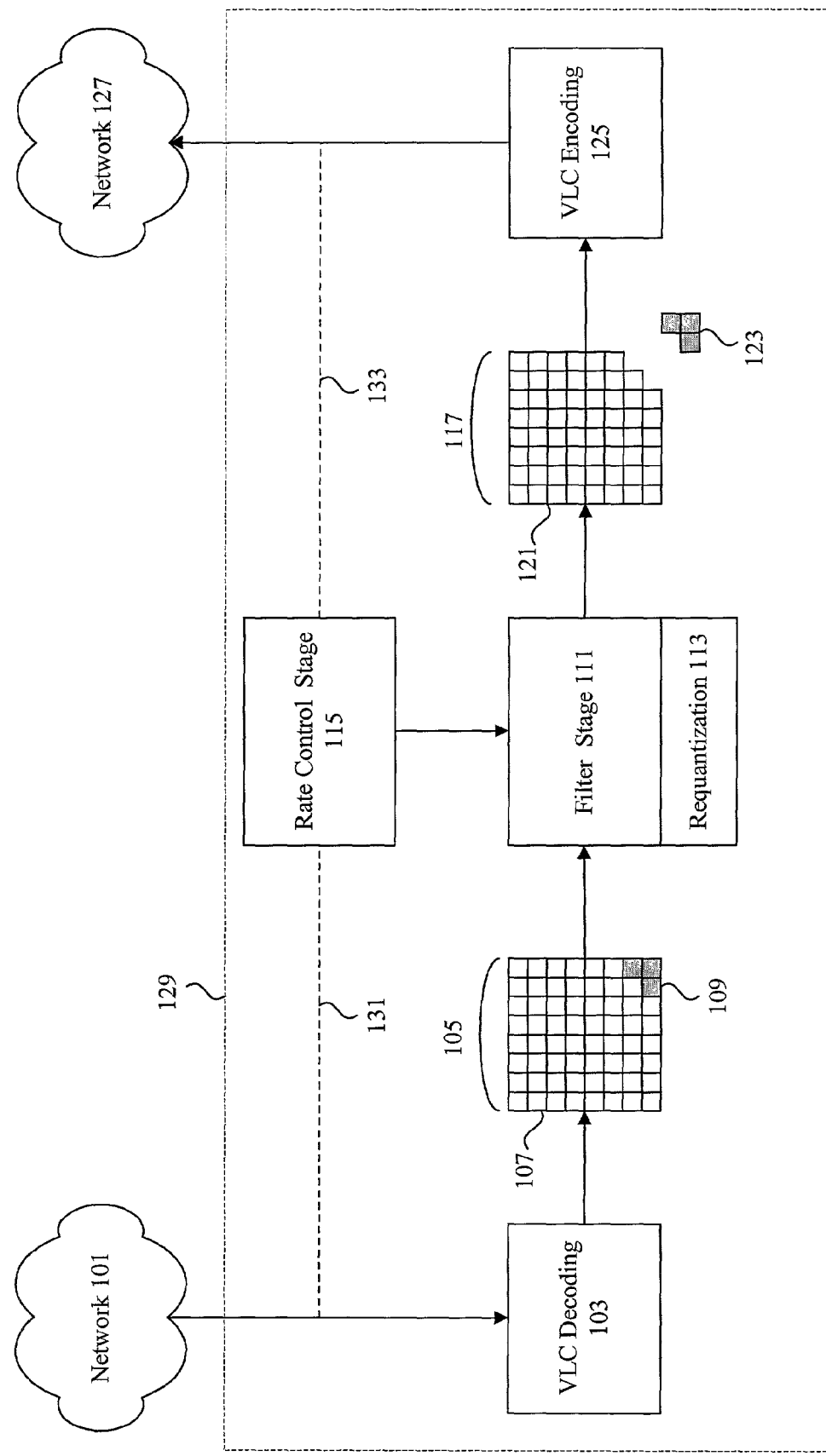
FIG. 1 is diagrammatic representation of a system that can use the techniques of the present invention, according to specific embodiments.

FIG. 1 is a diagrammatic representation of a system 129 that can use the techniques of the present invention. FIG. 1 shows a system 129 that couples network 101 and network 127. According to various embodiments, network 101 has one set of constraints while network 127 has a more restrictive set of constraints. For example, network 101 may allow transmission at a higher bit rate than network 127. A system 129 receiving encoded content can reduce or rescale the content to allow transmission onto network 127. In one example, the bandwidth allocated on a network 101 to a particular user is 1 MBps while the bandwidth allocated for transmission on network 127 for the same user is 0.8 MBps. A real-time video stream transmitted from one network to another may benefit from improved techniques for rescaling the video stream to comply with the more restrictive constrains of network 127.

In common embodiments, system 129 can be part of a network device such as a gateway, router, switch, or cable network headend equipment connecting two different networks or networks having different network constraints. According to various embodiments, the encoded content is an MPEG bitstream. Note that the invention is not limited to an application to MPEG compression, or even the video compression techniques generally. Rather the invention is applicable to any type of content in which transform coefficients are used to represent portions of content. Furthermore, the coefficients can be selected based upon the type of untransformed content they represent (e.g. high frequency vs. low-frequency spatial features of an image or an audio sample).

For convenience, the invention will be described in the context of MPEG-2 compression and bit rate reduction in an MPEG-2 video stream. The size of an MPEG bitstream can be reduced by filtering the transform coefficients in each MPEG frame. A system 129 can then apply a reduction ratio of 0.8 to the encoded content by filtering coefficients. It should be noted that filtering includes altering coefficients, zeroing coefficients, setting a coefficient string to a particular sequence, or generally changing transform coefficients in block to allow an effective resealing ratio. As will be appreciated by one of skill in the art, the bitstream is partially decoded before the transform coefficients are altered or filtered. The techniques of the present invention allow resealing of a data sequence without complete decoding of the data sequence. According to various embodiments, rescaling the video stream does not involve computationally expensive inverse transform operations. Variable length decoding stage 103 receives the MPEG encoded bitstream and applies variable length decoding to extract a block 105. Block 105 typically represents a portion of a frame of MPEG video.

As will be appreciated by one of skill in the art, the basic structure for a coded video frame or picture is a block that is an 8 pixel by 8 pixel array. Multiple blocks form a macroblock, which in turn form part of a slice. A coded frame consists of multiple slices. Multiple coded frames form a group of frames. Such hierarchical layering of data structures localizes the most basic processing on the lowest layer, namely blocks and macroblocks.

As noted above, each block contains variable length codes for DCT coefficients. In the MPEG-2 syntax, the picture data section contains the bulk of the compressed video images. This is where the DCT coefficients are encoded as variable length codes. For a typical bitstream, this portion of the data takes somewhere between 70%–90% of the total bit usage of a coded picture, depending on the coded bit rate.

The access unit level information relates to coded pictures and may specify whether a picture is an intra frame (I-frame), a predicted frame (P-frame), or a bi-directional frame (B-frame). An I-frame contains full picture information. A P-frame is constructed using a past I-frame or P-frame. A bi-directional frame (B-frame) is bi-directionally constructed using both a past and a future I or P-frame, which are also called anchor frames.

Each video frame can be represented by luminance and chrominance pixels. The techniques of the present invention apply regardless of the type of frame or the type of pixel. Block 105 contains transform coefficients that roughly correspond to frequency information contained in the frame of MPEG video. Block 105 has low-frequency transform coefficients 107 and higher frequency transform coefficients 109. Although the transform coefficients in block 105 do not correspond exactly to frequency information contained in a portion of the frame of MPEG video, the coefficients provide general information on the various types of frequency information in the portion of the frame. Block 105 is passed to a filtering stage 111. Filtering stage 111 is optionally coupled with requantization stage 113. Both filtering at filtering stage 111 and requantization at requantization stage 113 can be used to reduce the bandwidth requirements of the MPEG encoded bitstream. Filtering stage 111 can be used to selectively filter transform coefficients.

According to various embodiments, filtering transform coefficients can comprise zeroing the transform coefficients or setting the transform coefficients to a particular sequence of numbers. In FIG. 1, transform coefficients 123 of block 117 are selected for filtering. Block 117 of modified transform coefficients comprises lower frequency transform coefficients 121 and higher frequency transform coefficients 123. Often frequency can be used as a filtering criteria for the coefficients. Of course, other criteria such as computational convenience, etc. can be used to select coefficients for filtering. Various selection and filtering criteria will be described further below.

Certain embodiments of the present invention select the higher frequency components 123 of the modified transform coefficient block 117 for zeroing. Of course there may be other frequency selection criteria that can be used. Requantization stage 113 can also be used to zero transform coefficients 117 or to reduce the number of levels represented by a block 117. As will be appreciated by one of skill in the art, a block of modified transform coefficients 117 containing fewer levels and more zeroes can be efficiently variable length coded at VLC recoding stage 125. The modified transform coefficient block 117 can be encoded as a reduced output bitstream. The output bitstream can be provided to network 127.

Rate control stage 115 monitors the number of input bytes and the number of output bytes along lines 131 and 133 respectively. Rate control stage 115 can use information about the number of input and output bytes for prior filtered blocks of data to provide rate control information for a current block. Rate control information can be provided to filtering stage 111 and to requantization stage 113 to allow control over rescaling. Information provided by rate control stage 115 can be used by filtering stage 111 and requantization stage 113 to determine specifically how transform coefficients will be filtered. According to various embodiments rate control information is provided by rate control stage 115 for each macroblock.

As will be appreciated by one of skill in the art, each macroblock can comprise multiple component blocks. In MPEG-2, various formats may be employed to define the luminance and chrominance pixel content at a macroblock. Using the 4:2:0 format, a macroblock comprises four 8×8 matrices of luminance coefficients and two 8×8 matrices of chrominance coefficients. Rate control information can be updated at rate control stage 115 after a macroblock has been processed. Of course, other formats can use the techniques of the present invention. Alternatively, rate control stage 115 may provide rate control information to filtering stage 111 on a per frame or a per block basis.

Allowing rate control on a per block basis is a significant advantage of the present invention. Conventional rate control techniques typically only provide for rate control on a per macroblock or per video stream basis, not on a per block basis. As will be appreciated by one of skill in the art, a macroblock typically comprises a plurality of blocks.

Although that techniques of the present invention can be used in a network node connecting two networks having different bandwidth constraints, the techniques of the present invention are more general and can be applied in a variety of different contexts. For example, instead of receiving an MPEG encoded bitstream from a network 101, the MPEG encoded bitstream may be contained in a file that can be reduced in size prior to either storage, viewing, or transmission. System 129 can be used to reduce the size of a transform encoded file saved on a hard disk, CD, DVD, or other media. An MPEG encoded file can be variable length decoded at variable length decoding stage 103. A block 105 is forwarded to filtering stage 111 and/or requantization stage 113 to provide a modified block 117.

According to various embodiments, a block of altered transform coefficients is then recoded at VLC encoding stage 125 and provided to output. A rate control stage 115 can provide rate control information to filtering stage 111 and requantization stage 113 based on the desired file reduction size. Information can be provided to filtering stage 111 and requantization stage 113 to allow a determination of how transform coefficients are altered or filtered. As noted above, rate control information can be provided for filtering on a per macroblock basis.

Figure 2:
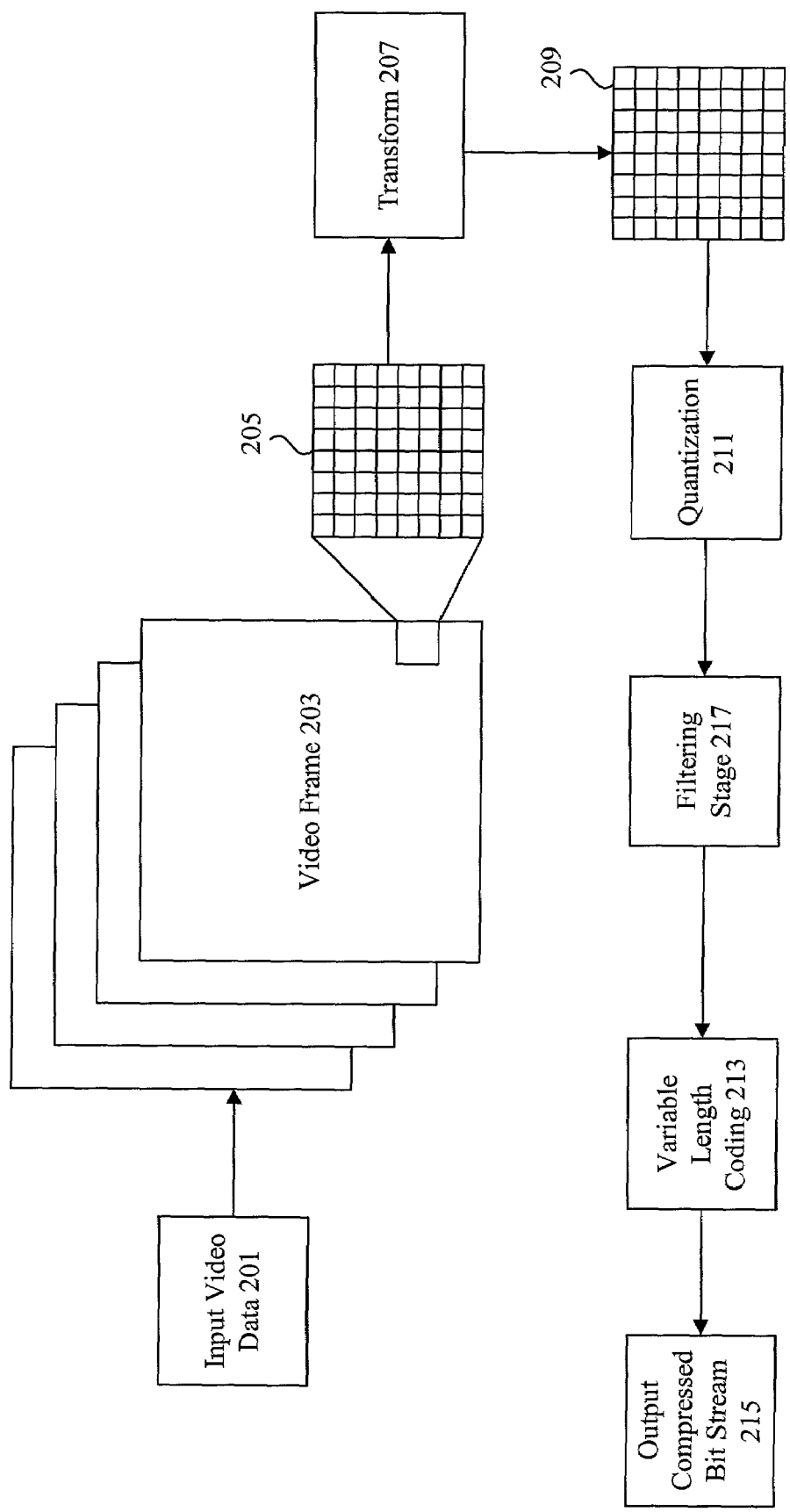
FIG. 2 is a diagrammatic representation of another system that can use the techniques of the present invention, according to specific embodiments.

FIG. 2 is a diagrammatic representation of a another system that can use the techniques of the present invention. FIG. 2 describes a system for using the techniques of the present invention to initially encode video content. Video data 201 is split into video frames 203. Each video frame 203 can be uncompressed data. Although FIG. 2 is described in the context of video data, one of skill in the art will understand that the techniques of the present invention can be applied to other types of data such as simple image data (e.g. JPEG) or audio data. Each video frame 203 can be divided into 16×16 pixel macroblocks. The macroblocks are further separated into component blocks of pixels.

Block 205 can represent 64 pixels of image data. A transform stage 207 is applied to the block 205. According to specific embodiments, the transform stage 207 is a discrete cosine transform (DCT). The transform stage converts block 205 representing pixel information to block 209 containing DCT coefficients. The transform coefficient block 209 can then be quantized at quantization stage 211. Using the techniques of the present invention, filtering stage 217 contains mechanisms for selectively filtering DCT coefficients. The filtering stage 217, can contain mechanisms for selecting how and how many DCT coefficients to filter in order to obtain desired rescaling ratios. According to various embodiments, the coefficient filtering occurs for various intrablocks.

As will be appreciated by one of skill in the art, the coefficients in the top left region of block 209 roughly correspond to low frequency components of block 205. The coefficients in the bottom right region of block 209 roughly correspond to high frequency components of block 205. The human eye is typically more sensitive to low frequency components than to high frequency components of an image. By removing low frequency components of an image, the edges and corners become more abrupt. By removing high frequency components of an image, the edges and corners tend to blur. By selectively filtering DCT coefficients of block 209, an image can be minimally altered while falling within bounds of a reduction ratio. The techniques of the present invention allow DCT coefficients to be selectively filtered in order to comply with reduction ratios.

The techniques of the present invention allow filtering stage 207 to dynamically vary the number of DCT coefficients dropped based on the varying requirements of macroblock sequences. For example, a few macroblocks of a particular video frame may be particularly easy to compress. This may be due to the fact that the first few macroblocks contain mostly smooth areas. Quantization stage 211 and variable length and coding 213 are able to compact the information associated with the first he macroblocks into a small number of output bits in output bitstream 215. The target reduction ratio may seem easily achievable based on the first few macroblocks.

The filtering stage 217 can selectively filter fewer DCT coefficients. However, if the compression of prior macroblocks indicates that the total reduction ratio has not been achieved, filtering stage 217 can filter more DCT coefficients. Filtering more DCT coefficients tends to decrease the number of bits in the output compressed bitstream 215.

As noted above, the DCT coefficients correspond to limited ranges of frequency information for the block 205. Often frequency can be used as a filtering criteria for the coefficients. Of course, other criteria such as computational convenience can be used to select coefficients based upon their contribution on human perception. As noted, the human eye is more sensitive to degradation of low-frequency spatial information than the degradation of higher frequency spatial information. Therefore, certain embodiments of this invention select the high frequency components of coefficient matrices for dropping. Of course there may be other frequency regimes that could be selected. In one embodiment, a system/method of this invention select particular frequency bands for filtering. Alternatively, for applications in edge and line detection, low-frequency components can be selected for filtering.

The results from filtering stage 217 are variable length coded using VLC encoding at 213. The output compressed bitstream is provided at 215.

Although the techniques of the present invention can be used in conjunction with all of the techniques described in FIG. 2, it should be noted that not all the techniques of FIG. 2 need to be used. For example, using the techniques of the present invention for selectively filtering DCT coefficients can allow quantization stage 211 to be avoided. Avoiding quantization can prevent irrecoverable loss of image information.

Figure 3A:
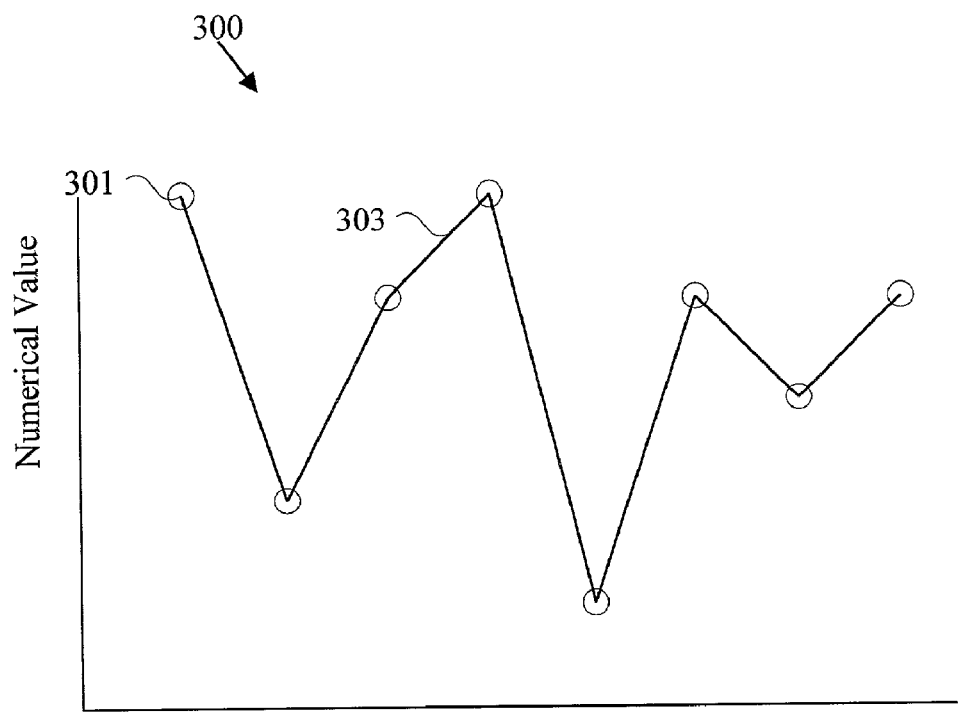
FIGS. 3A and 3B are graphical representations of numbers, the DCT coefficients associated with the numbers, and the IDCT of the DCT coefficients, according to specific embodiments.
Figure 3B:
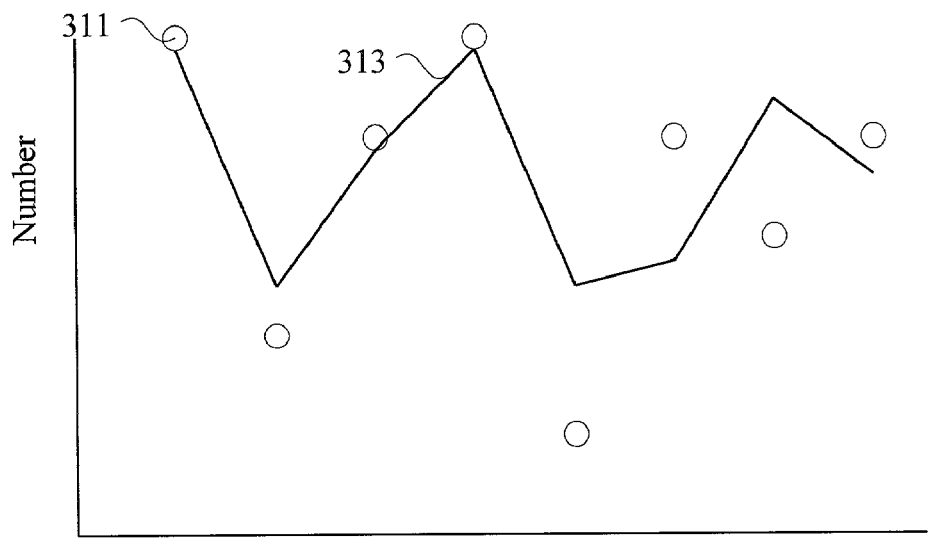

FIGS. 3A and 3B are graphical representations of information loss when DCT coefficients are selectively filtered. In FIG. 3A, numerical values 307 are represented in graph 300. The values may be pixel luminance values, for example. Numerical value 301 in the graph corresponds to numerical value 305 in the list. The DCT coefficients for numerical values 307 are DCT coefficients 309. The eight numbers shown in graph 300 are transformed into the eight DCT coefficients 309. Taking an inverse discrete cosine transform (IDCT) using the eight DCT coefficients 309 produces curve 303 in graph 300. It should be noted that all the information associated with numbers 307 is maintained. By using all the DCT coefficients, line 303 corresponds exactly with numbers 307 in graph 300.

In FIG. 3B, a DCT transform is applied to numerical values 317 to produce DCT coefficients. However, two high frequency DCT coefficients are filtered to yield DCT coefficients 319. As noted above, DCT coefficients can be filtered in order to comply with desired reduction ratios. Taking the IDCT using the six DCT coefficients 319 yields curve 313. It should be noted that the curve 313 does not correspond exactly with numerical values 317. Curve 313 somewhat approximates the original numbers 317. Accordingly, it is typically desirable to filter or alter as few DCT coefficients as possible.

Generally, the number of coefficients designated for filtering is referred to herein as the cut-off index. However, a cutoff-index can be defined in many ways such as a position index separating coefficients associated with the pass band and coefficient associated with the stop band. As will be appreciated by one of skill in the art, DCT coefficients roughly correspond to frequency components of a particular data sequence. The cut-off index can also be referenced as a cut-off frequency. That is, frequency components above or below a certain cut-off frequency may be selectively filtered. According to other embodiments multiple cut-off indices can be used. The DCT coefficients between two cut-off indices can be filtered. In the same way, DCT coefficients between several cut-off frequencies can be filtered. Multiple cut-off indices and cut-off frequencies can allow filtering of DCT coefficients that have the least perceivable effect on the original data sequence. Most fundamentally, a cut-off index represents a quantity of data that must be removed to meet some bandwidth or storage requirements.

Figure 4:
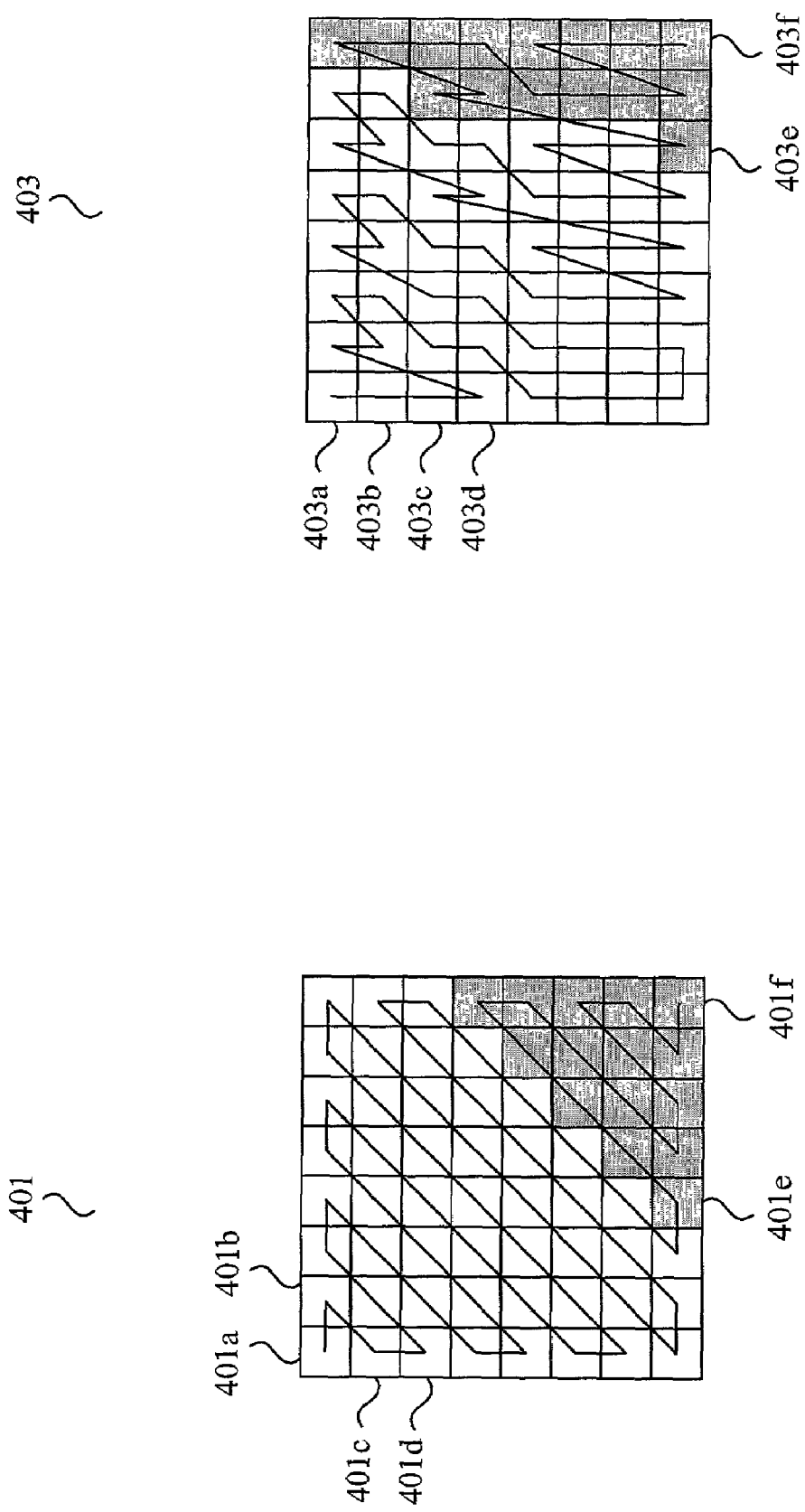
FIG. 4 is a diagrammatic representation of filtering applied to MPEG-2 block scanning mechanisms, according to specific embodiments.

FIG. 4 is a diagrammatic representation of blocks having coefficients selected for dropping based on a cut-off index in two different scan patterns. Using a cut-off index, coefficients with an index that is higher than the cut-off index will be filtered. As noted, filtering can mean zeroing coefficients. In MPEG-2, the transform coefficients of a block are indexed and coded in a scan pattern to take advantage of the correlation between the coefficients. Several scan patterns can be used.

Scan pattern 401 shows the zigzag scan pattern. Transform coefficient 401a is scanned first followed by transform coefficients 401b, 401c, and 401d. Transform coefficient 401f is scanned last. Transform coefficient 401e is the 50th transform coefficient of block 401 scanned according to the zigzag scan pattern. An alternative scan pattern shown in block 403 also contains 64 transform coefficients. Transform coefficient 403a is scanned first followed by transform coefficient 403b, 403c, and 403d. Transform coefficient 403f is scanned last. Transform coefficient 403e is the 50th transform coefficient of block 403 according to the alternative scan pattern. The zigzag scan pattern is generally used for progressive scanning and the alternate scan pattern is generally used for interlaced scanning.

It should be noted that a cut-off index of 50 will drop all coefficients scanned after block 401e in the zigzag scan pattern and 403e in the alternative scan pattern. Although a cut-off index of 50 drops different coefficients depending on the scan pattern, dropping coefficients based on a cut-off index generally removes higher frequency coefficients. It should be noted that although a cut-off index is used to remove higher frequency components, the cut-off index can also be used to remove low-frequency components as needed. Low-frequency components can be removed for edge or line detection applications where high frequency coefficients are more important than low frequency coefficients.

Figure 5:
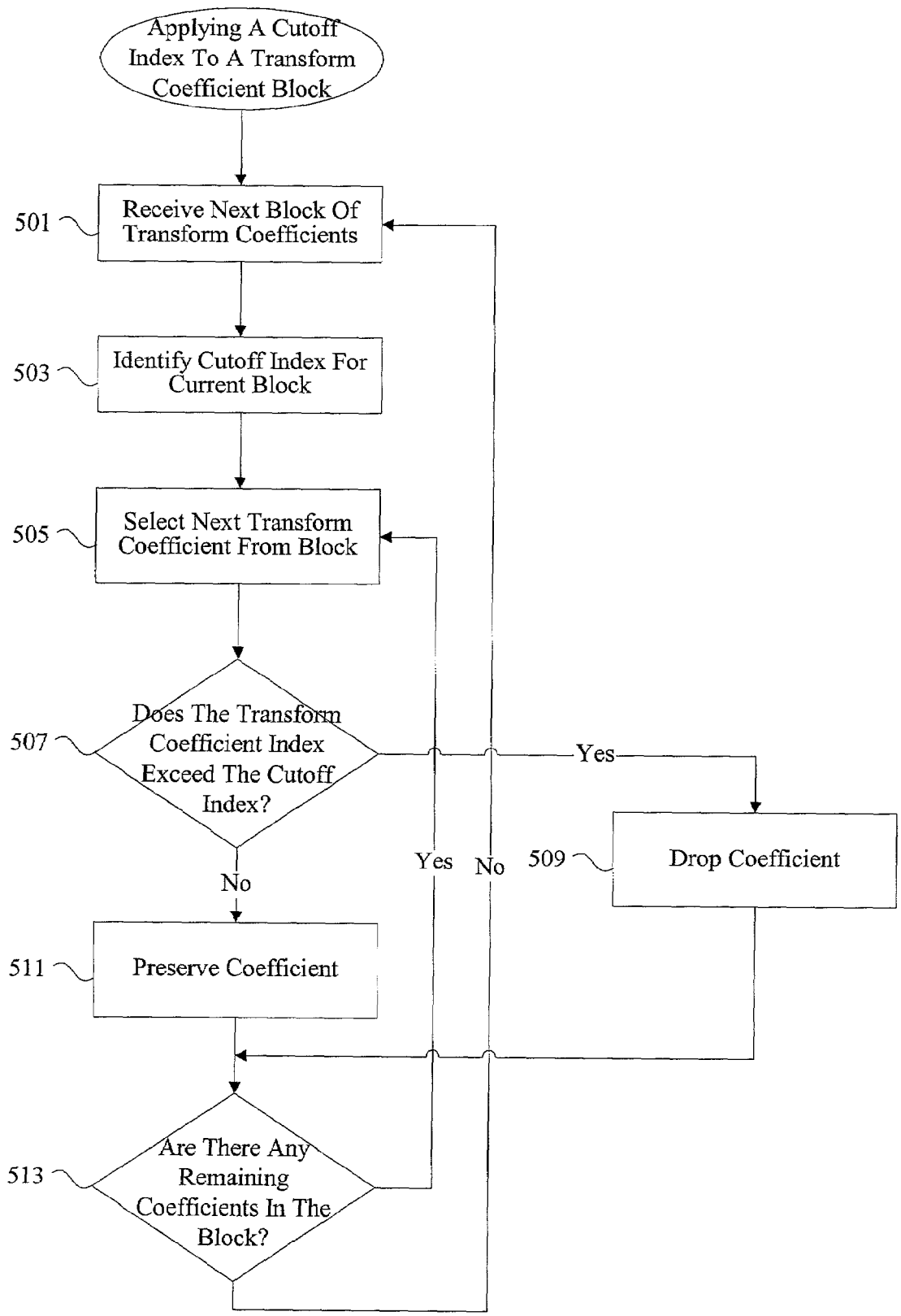
FIG. 5 is a process flow diagram showing techniques for applying a cut-off index, according to specific embodiments, according to specific embodiments.

FIG. 5 is a process flow diagram describing a technique for using a cut-off index to filter transform coefficients, according to various embodiments. At 501, the next block of transform coefficients is received. The block of transform coefficients can represent the frequency information associated with the luminance or chrominance pixels of an transform encoded frame such as an MPEG-2 encoded frame. At 503, a cut-off index is selected. A cut-off index can be a predetermined based on an estimate of the number of transform coefficients that should be dropped in order to achieve a target reduction ratio. For example, a cut-off index of 32 transform coefficients in a block of 64 transform coefficients can be used where the desired target reduction ratio is 50 percent. It should be noted, however, that the target reduction ratio may not correspond linearly with the number of coefficients dropped. That is, dropping 20 percent of the coefficients may not yield a reduction ratio of 80 percent. The reduction ratios attainable by dropping a given number of coefficients varies depending on the type of data and the efficiency of the variable length coding.

Various methods for selecting a cut-off index are described in U.S. patent application Ser. No. 09/870,177 by Lee et al., and titled Methods and Apparatus for Selecting a Cut-off index and in, the entirety of which is incorporated by reference for all purposes. Methods for determining a cut-off index are also described in the U.S. patent application Ser. No. 09/867,967 by Shen et al., and titled Methods and Apparatus for Updating a Reduction Ratio, the entirety of which is incorporated by reference for all purposes. After a cut-off index is selected at 503, the next transform coefficient from the block is selected at 505. If the transform coefficient index exceeds a cut-off index, the transform coefficients is dropped at 509. The transform coefficient index can be the position of the transform coefficient in a block. For example, the first standard coefficient in a block has a transform coefficient index of one. The last standard transform coefficient in a block has a transform coefficient index of 64, according to various embodiments. As noted above, the transform coefficients actually dropped can vary based on a scan pattern used.

Using a cut-off index of 32, the first 32 transform coefficients will not be dropped. A transform coefficient having an index of 33 out of 64 will be dropped. A determination that the transform coefficient index for the transform coefficient exceeds the cut-off index is made at 507. If the coefficient index does not exceed the cut-off index, the transform coefficient is preserved at 511. A determination is made at 513 as to whether there are any transform coefficients remaining in the block. If there are transform coefficients remaining, the next transform coefficient from the block is selected at 505. If no transform coefficients remain at 513, then the next block of transform coefficient is received at 501. Although the process of FIG. 5 is described in a particular order, it should be noted that the process does not need to be performed in any specific sequence.

For example, various application specific integrated circuits (ASICs) are available for determining whether or not transform coefficients should be dropped based on a cut-off index. As will be appreciated by one of skill in the art, certain hardware embodiments can determine whether the transform coefficients in a particular block will be dropped by making parallel determinations for all the transform coefficients in a block simultaneously.

Figure 6:
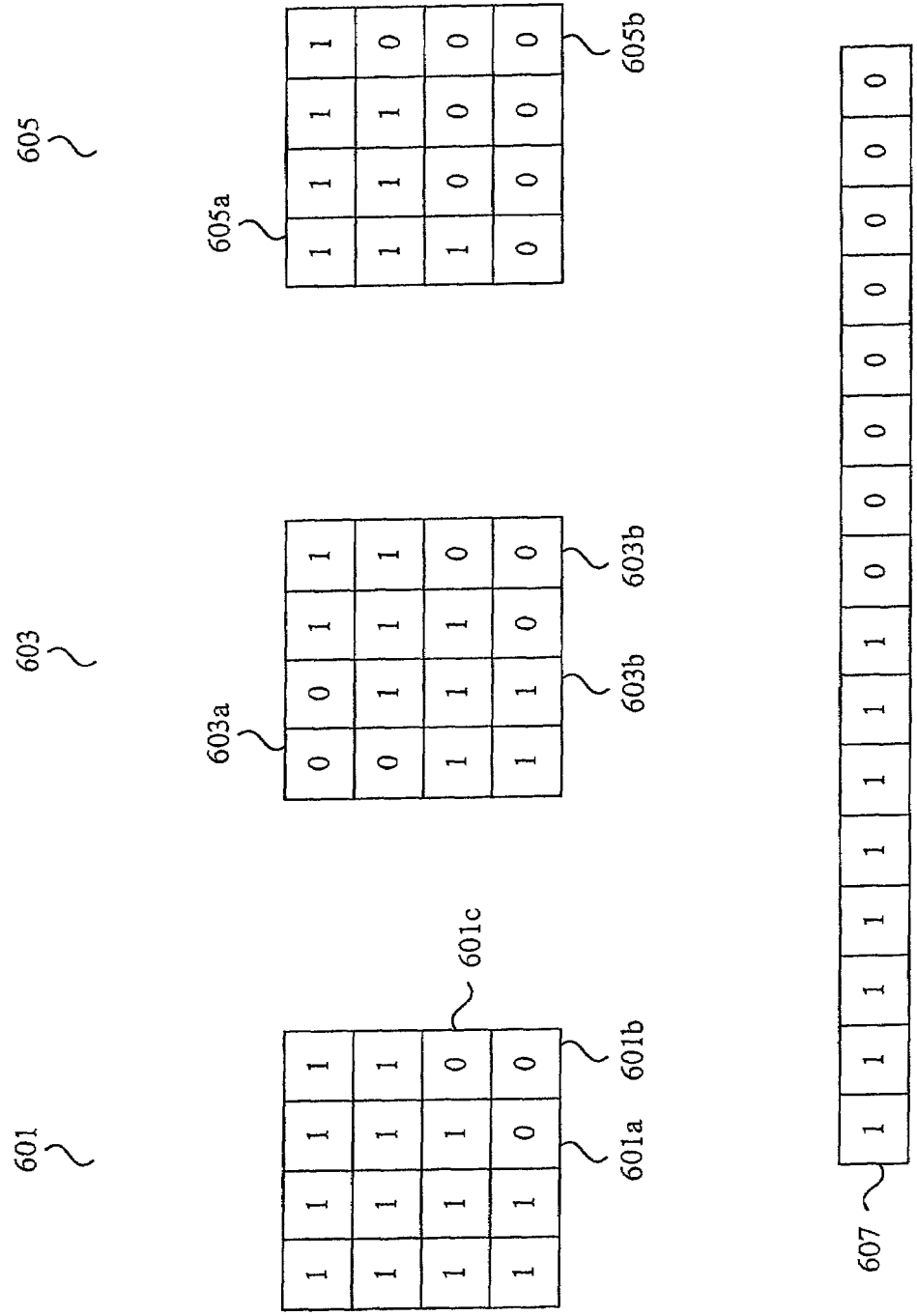
FIG. 6 is a diagrammatic representation of filters using zeros and ones, according to specific embodiments.

FIG. 6 is a diagrammatic representation of filters that can be used to selectively drop transform coefficients according to the techniques of the present invention. Filters of different strengths can be predetermined and stored. It should be noted that typically filters for MPEG-2 encoded blocks will be 8×8 blocks. However, for ease of discussion, the blocks shown in FIG. 6 are 4×4 blocks. The filter parameters can be as simple as an array of zeros and ones, where a one corresponds to a coefficient associated with a pass band and a zero corresponds to a coefficient associated with a stop band. A transform coefficient from a block corresponding to a one in the filter block will be retained, while a transform coefficient corresponding to zero in the filter block will be dropped. Filter 601 illustrates a filter that selects three coefficients 601a, 601b, and 601c for dropping. The other values in the filter are ones indicating pass band. It should be noted that filter 601 provides one way of implementing a cut-off index of 13.

Filter 603 illustrates an implementation of a band pass filter. Filter 603 contains ones in the pass band 603b that allow mid-frequency transform coefficients in a block to be retained. Low frequency band 603a and high frequency band 603c contain zeros that filter high and low frequency transform coefficients in a block.

Filter 605 is a filter that is configured to drop half the coefficients associated with higher frequency components at a block. Ones are placed in portion 605a representing lower frequency components while zeroes are placed in portion 605b representing higher frequency components. Filter 605 applied to a block of transform coefficients retains only the eight lower frequency coefficients of the transform block.

It should be noted that although the filter is represented as a two-dimensional block, the filter can just as easily be represented as a one-dimensional array. Filter 607 is one representation of filter 605 using a one-dimensional array of ones and zeroes.

Figure 7:
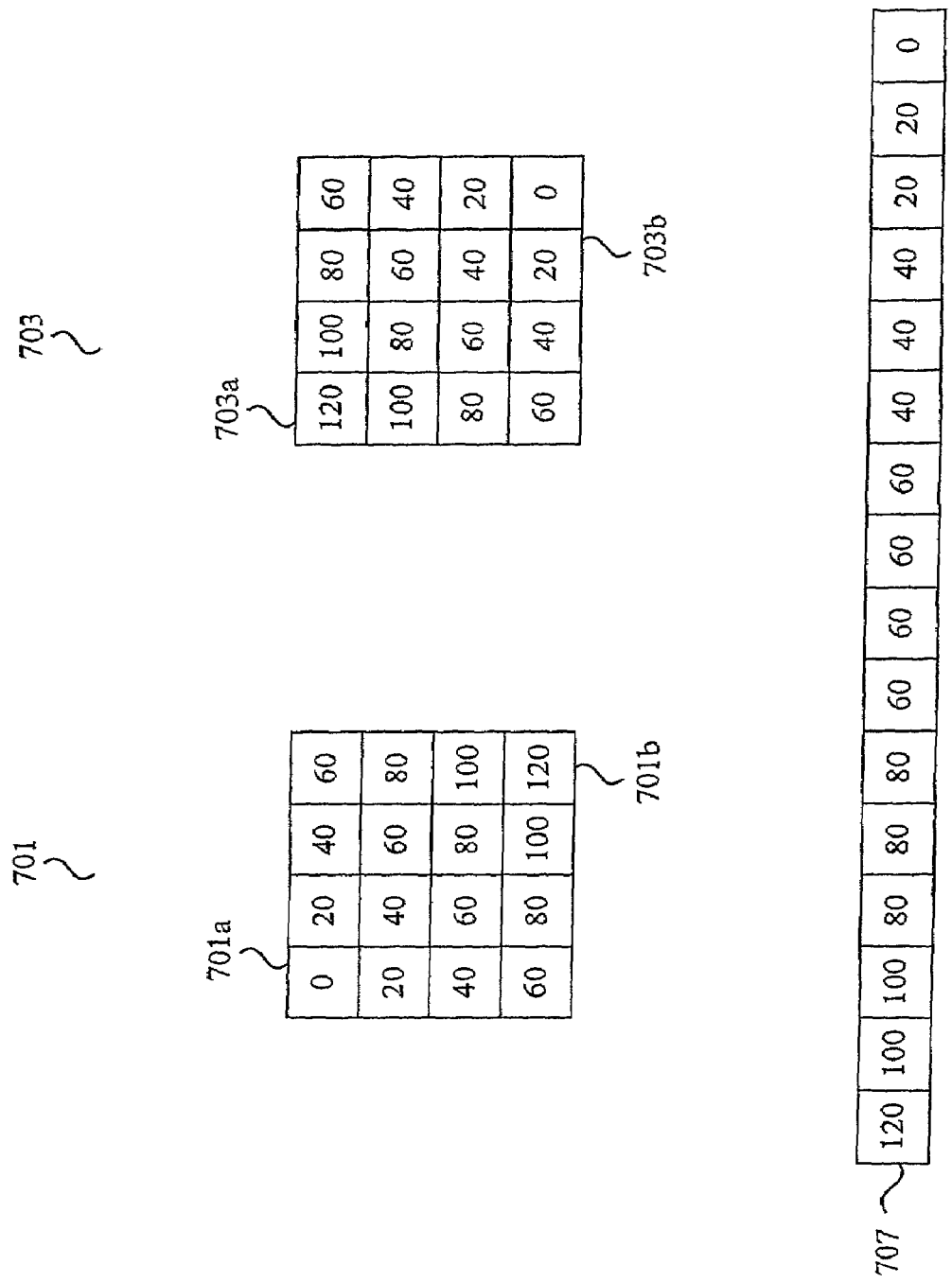
FIG. 7 is a diagrammatic representation of filters using threshold values, according to specific embodiments.

Instead of using one to zeroes, thresholds can be used to determine whether a particular coefficient in a transform block should be dropped. FIG. 7 is a diagrammatic representation of filter blocks using thresholds for determining whether transform coefficients should be filtered according to various embodiments. As will be appreciated by one of skill in the art, transform coefficients in a block roughly correspond to frequency information of a portion of video or audio and can have different values. Larger values tend to indicate transform coefficients of greater importance. According to various embodiments, if the transform coefficient of a block exceeds the corresponding value in a filter, the transform coefficient is retained.

Filter 701 provides one example of a filter using threshold values. Filter 701 has lower values in portion corresponding to low-frequency coefficients and higher values corresponding to high frequency coefficients. That is, applying filter 701 to a transform coefficient block would retain most of the low-frequency coefficients because most of the lower frequency coefficients would be higher than the small values in portion 701a. Portion 701b in filter 701 contains higher values. Transform coefficients of a block would only be retained if they had a magnitude greater than the corresponding value in the filter 701. That is, high frequency coefficients in a block would only be retained if they had sufficient magnitude to exceed the higher values contained in portion 701b.

Filter 703 is another embodiment of a filter that can be used to filter transform coefficients. Filter 703 has high threshold values in portion 703a. A transform coefficient block applying filter 703 would have many low-frequency coefficients removed since many low-frequency coefficients do not exceed the threshold values in portion 703a. A filter using threshold values can also be implemented as a one-dimensional array as shown in filter 705. It should be noted that the threshold can be varied according to the reduction ratio control mechanism. The threshold values as well as the filter can be altered on a per block basis. In one embodiment, the filter is varied based on whether the block is associated with luminance components or chrominance components.

It should be noted that a variety of filters including low pass, high pass, notch, comb, and band pass filters can be implemented with filters using ones and zeroes shown in FIG. 6, or filters using threshold values shown in FIG. 7.

Figure 8:
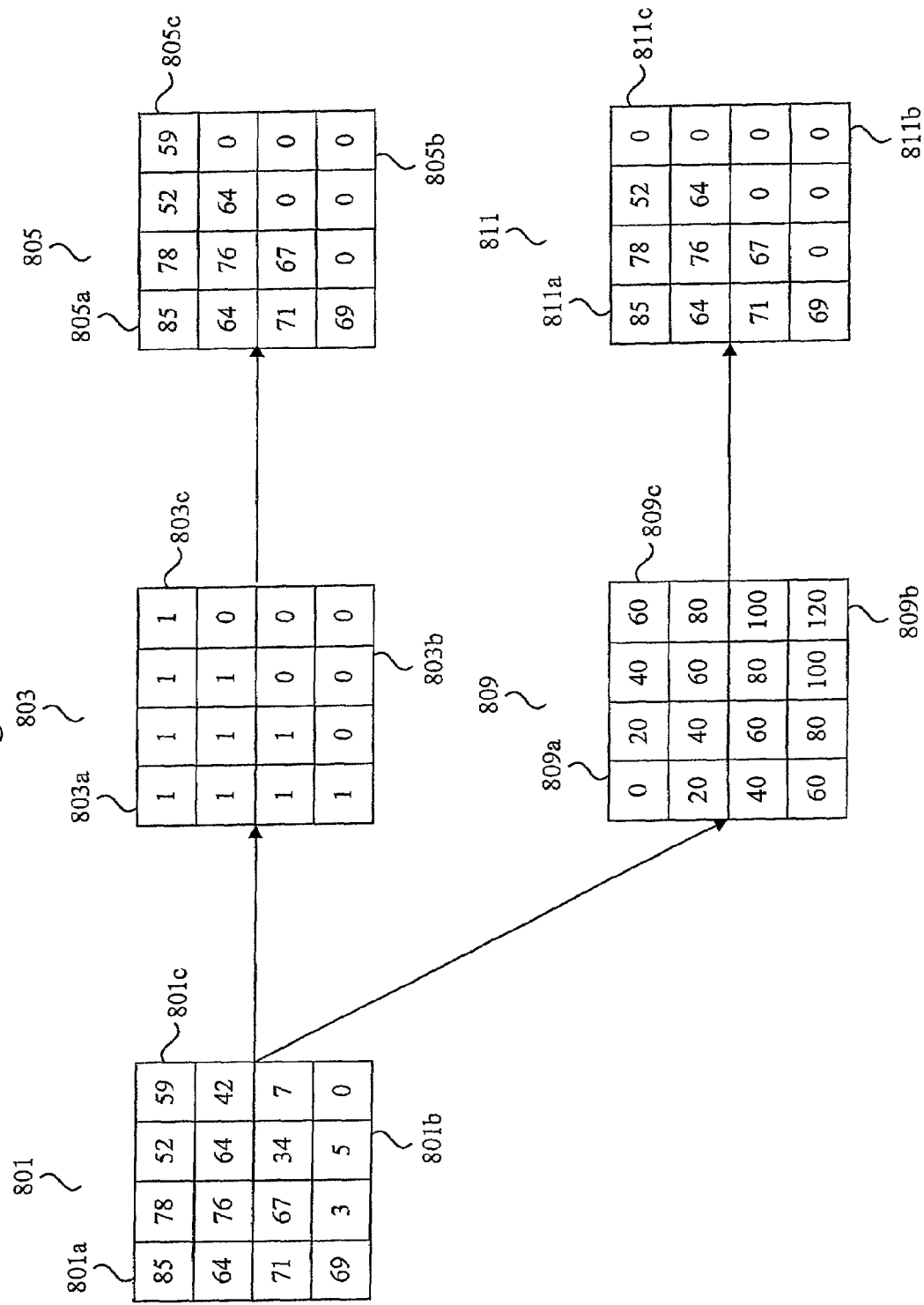
FIG. 8 is a diagrammatic representation of the application of a filter using ones and zeros and a filter using threshold values, according to specific embodiments.

FIG. 8 is a diagrammatic representation of the application of two different filters to a block of transform coefficients. Block 801 contains low-frequency coefficients 801a and high frequency coefficients 801b. Filter 803 uses ones and zeroes to filter the coefficients of block 801. Block 803 contains ones in portion 803a and zeroes in portion 803b. Applying filter 803 to transform coefficient block 801 yields block 805. Block 805 contains low-frequency coefficients 805a that correspond to low-frequency coefficients 801a. High frequency coefficients 805b are filtered because of the zeroes in portion 803b of filter block 803.

Filter block 809 uses threshold values to filter coefficients of block 801. Coefficients of block 801 exceeding the corresponding value in filter block 809 are preserved. Coefficients of block 801 that do not exceed the corresponding value in filter block 809 are dropped. For example, coefficient 801c in block 801 does not exceed the corresponding coefficient value 809c of 60, since 59 is less than 60. Consequently, the resulting block 811 has a 0 in value 811c. A filter 803 using ones and zeroes and filter 809 using threshold values can yield similarly processed blocks in 805 and 811. It should be noted however, that the resulting blocks 805 and 811 can be also quite different for different values.

Figure 9:
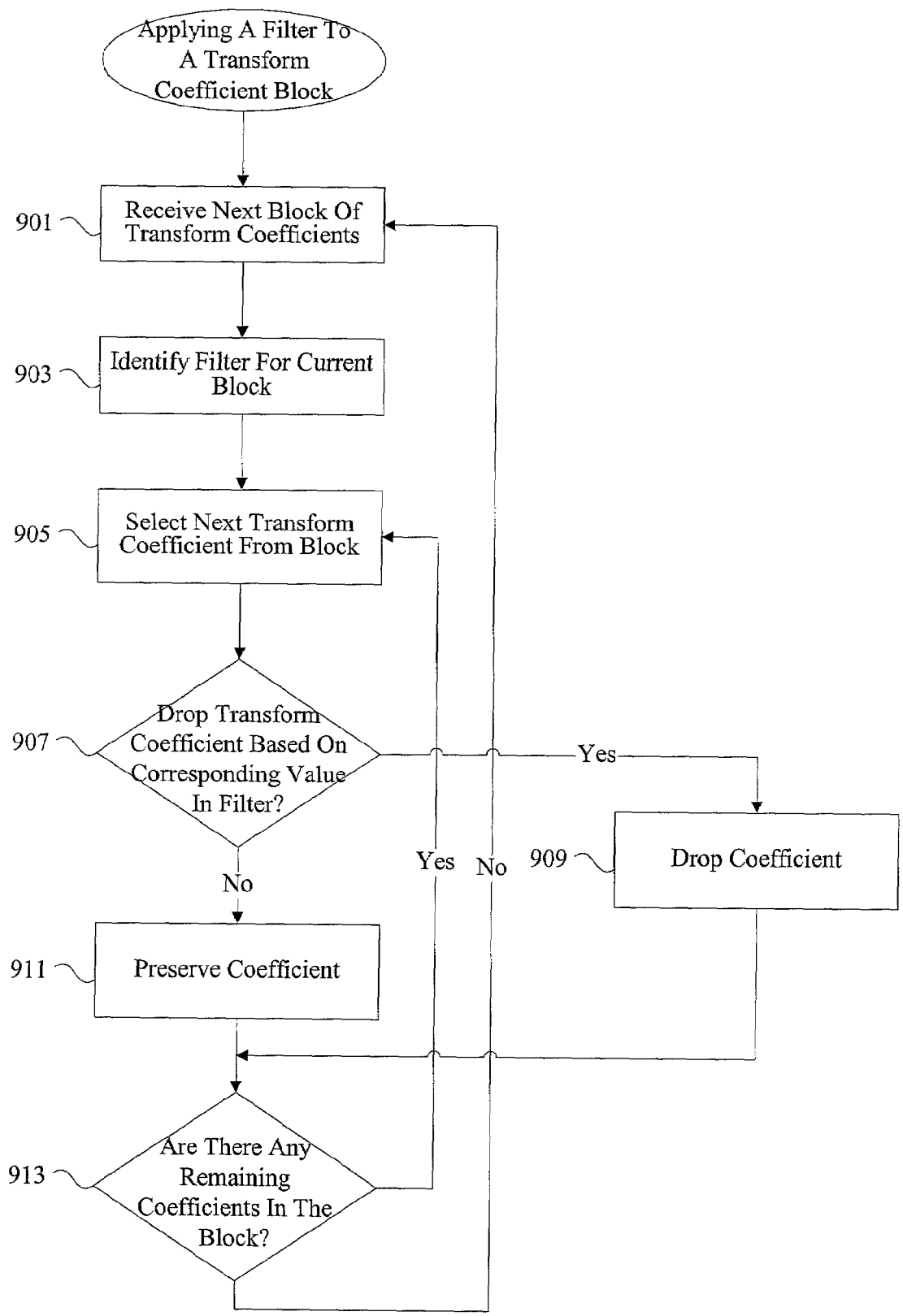
FIG. 9 is a process flow diagram showing techniques for applying a filter, according to specific embodiments, according to specific embodiments.

FIG. 9 is a process flow diagram describing a technique for using predetermined filters to select how transform coefficients are filtered. At 901, the next block of transform coefficients is received. At 903, a filter for the current block is identified. The filter selected can be one of those shown in FIG. 6 and FIG. 7. For example, to achieve a target reduction ratio of 50 percent, a filter can be selected at 903 that is similar to filter 603 of FIG. 6. Techniques for selecting a filter are described in U.S. patent application Ser. No. 09/867,967 by Shen et al., and titled Methods and Apparatus for Updating a Reduction Ratio, the entirety of which is incorporated by reference for all purposes. At 905, the next transform coefficient from the block is selected. It is determined at 907 whether to drop the transform coefficients based on a selected filter. Using the filters of FIG. 6, if the selected transform coefficient corresponds to a one in the selected filter, the transform coefficient is preserved at 911. If the selected transform coefficient corresponds to a zero from the selected filter, the transform coefficient is dropped at 909.

Applying a filter of FIG. 7, a determination is made at 905 as to whether the selected transform coefficient exceeds a corresponding value in the selected filter. If the transform coefficient value exceeds a corresponding value in the selected filter, the transform coefficient is dropped at 909. If the transform coefficient selected from the block at 905 does not exceed the corresponding value of the filter selected at 903, the transform coefficient is preserved at 911. As will be appreciated by one of skill in the art, the process flow can also be easily configured to drop coefficients when transform coefficients do not exceed the corresponding value in the selected filter. In other words, the threshold can either be the upper threshold or lower threshold for retaining a transform coefficient. At 913, it is determined whether any coefficients remain in the block. If coefficients remain, the next transform coefficient from the block is selected at 905. Otherwise, the next block of transform coefficients is received at 901. As noted above, the process of FIG. 9 can be implemented using hardware that takes advantage of parallel processing. Certain hardware embodiments may be configured to apply the filter to all the transform coefficients of a block simultaneously, such as in a vector or matrix operation.

The present invention for filtering transform coefficients associated with an input bit sequence to provide modified transform coefficients associated with a rate reduced output bit sequence can be implemented in various network systems. In various embodiments, the techniques of the present invention are implemented in the headend of a high bandwidth networks such as a cable network or a satellite network. In the context of a cable network, the invention may be implemented in a standalone system, such as Cisco 6920 RateMux® available from Cisco Systems, Inc, or in a line card of a cable network headend such as the Cisco UBR 7200 also available from Cisco Systems, Inc.

Figure 10:
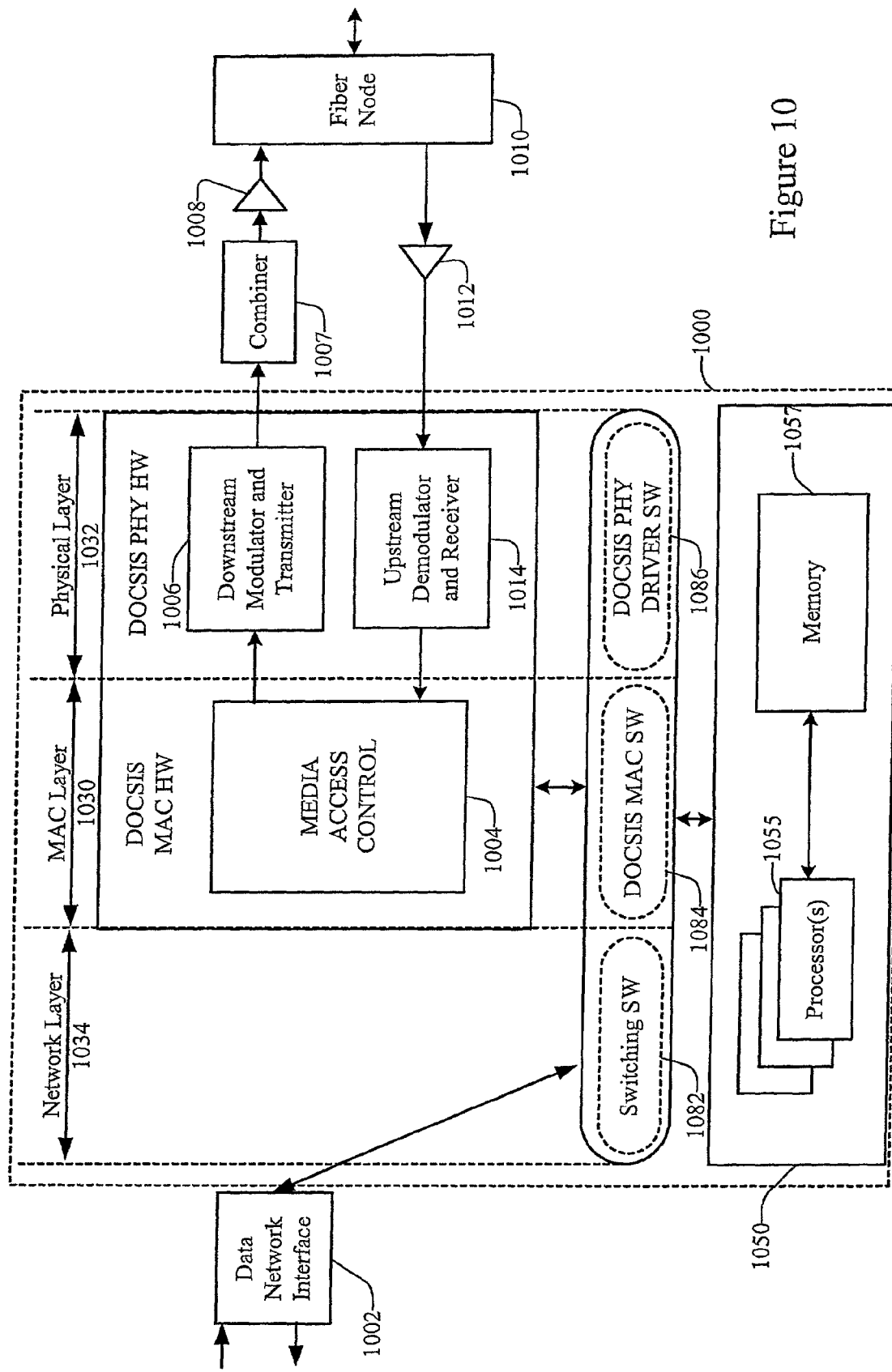
FIG. 10 is a diagrammatic representation of a system that can be used to implement the techniques of the present invention.

FIG. 10 depicts the basic components of a cable modem headend that can be used to implement the present invention, according to specific embodiments. Although the techniques of the present invention can be integrated into a cable modem headend, the present invention can also be used in a standalone system. FIG. 10 shows an implementation using the cable modem headend.

A Data Network Interface 1002 is an interface component between an external data source and the cable system. External data sources transmit data to data network interface 1002 via optical fiber, microwave link, satellite link, or through various other media. Also as mentioned above, a Media Access Control Block (MAC Block) 1004 receives data packets from a Data Network Interface 1002 and encapsulates them with a MAC header.

In a specific embodiment as shown in FIG. 10, the CMTS provides functions on three network layers including a physical layer 1032, a Media Access Control (MAC) layer 1030, and a network layer 1034. Generally, the physical layer is responsible for receiving and transmitting RF signals on the cable plant. Hardware portions of the physical layer include a downstream modulator and transmitter 1006 and an upstream demodulator and receiver 1014. The physical layer also includes software 1086 for driving the hardware components of the physical layer.

Once an information packet is demodulated by the demodulator/receiver 1014, it is then passed to MAC layer 1030. A primary purpose of MAC layer 1030 is to encapsulate and decapsulate packets within a MAC header, preferably according to the above-mentioned DOCSIS standard for transmission of data or other information.

MAC layer 1030 includes a MAC hardware portion 1004 and a MAC software portion 1084, which function together to encapsulate information packets with the appropriate MAC address of the cable modem(s) on the system. After the upstream information has been processed by MAC layer 1030, it is then passed to network layer 1034. Network layer 1034 includes switching software 1082 for causing the upstream information packet to be switched to an appropriate data network interface on data network interface 1002.

When a packet is received at the data network interface 1002 from an external source, the switching software within network layer 1034 passes the packet to MAC layer 1030. MAC block 1004 transmits information via a one-way communication medium to downstream modulator and transmitter 1006. Downstream modulator and transmitter 1006 takes the data (or other information) in a packet structure and converts it to modulated downstream frames, such as MPEG or ATM frames, on the downstream carrier using, for example, QAM 104 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 1007. Converter 1008 converts the modulated RF electrical signals to optical signals that can be received and transmitted by a Fiber Node 1010 to the cable modem hub.

It is to be noted that alternate embodiments of the CMTS (not shown) may not include network layer 1034. In such embodiments, a CMTS device may include only a physical layer and a MAC layer, which are responsible for modifying a packet according to the appropriate standard for transmission of information over a cable modem network. The network layer 1034 of these alternate embodiments of CMTS devices may be included, for example, as part of a conventional router for a packet-switched network.

In a specific embodiment, the network layer of the CMTS is configured as a cable line card coupled to a standard router that includes the physical layer 1032 and MAC layer 1030. The techniques of the present invention including a filtering stage and rate control stage shown in FIG. 1 can be implemented on a line card. Using this type of configuration, the CMTS is able to send and/or receive IP packets to and from the data network interface 1002 using switching software block 1082. The data network interface 1002 is an interface component between external data sources and the cable system. The external data sources transmit data to the data network interface 1002 via, for example, optical fiber, microwave link, satellite link, or through various media. The data network interface includes hardware and software for interfacing to various networks such as, for example, Ethernet, ATM, frame relay, etc.

As shown in FIG. 10, the CMTS includes a hardware block 1050 including one or more processors 1055 and memory 1057. These hardware components interact with software and other hardware portions of the various layers within the CMTS. Memory 1057 may include, for example, I/O memory (e.g. buffers), program memory, shared memory, etc. Hardware block 1050 may physically reside with the other CMTS components.

In one embodiment, the software entities 1082, 1084, and 1086 are implemented as part of a network operating system running on hardware 1050. Further, the provisions of this invention for providing quality of service for multicast streams are preferably implemented in software as part of the operating system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the techniques of the present invention can be implemented between a landline network and a wireless network. The transform coefficient filtering can be applied to one or two dimension transform coefficients for a wide variety of data formats. Therefore, the scope of the invention should be determined with reference to the appended claims.

What is claimed is:

1. A method of reducing the bit rate of a video bitstream to a meet bandwidth constraint, the method comprising:

identifying transform coefficients representing video content in a frame or a portion of frame of the video bitstream;

providing rate control information for a block of video data, wherein the rate control information includes a number of input and output bits for prior filtered blocks of data; and filtering selected transform coefficients from the video bitstream to thereby reduce the bit rate of the video bitstream and produce a reduced bit rate for the video bitstream that meets the bandwidth constraint, wherein the video bitstream before filtering does not meet the bandwidth constraint and the video bitstream including the modified transform coefficients includes the reduced bit rate that meets the bandwidth constraint.

2. The method of claim 1, wherein filtering selected transform coefficients comprises using a cut-off index.

3. The method of claim 1, wherein filtering selected transform coefficients comprises using a filter.

4. The method of claim 3, wherein the filter comprises ones and zeros.

5. The method of claim 3, wherein the filter comprises threshold values that determine which transform coefficients are filtered.

6. A method of reducing the bit rate of a video bitstream to a meet bandwidth constraint the method comprising:

identifying transform coefficients representing video content in a frame or a portion of frame of the video bitstream; and filtering selected transform coefficients from the video bitstream to thereby reduce the bit rate of the video bitstream and produce a reduced bit rate for the video bitstream that meets the bandwidth constraint, wherein the video bitstream before filtering does not meet the bandwidth constraint and the video bitstream including the modified transform coefficients includes the reduced bit rate that meets the bandwidth constraint, wherein the method selectively filters fewer transform coefficients for a macroblock according to the number of the macroblock in a frame.

7. The method of claim 1 wherein the transform coefficients from the video bitstream are filtered differentially on a per block or a per macroblock basis.

8. A method of filtering transform coefficients associated with an input bitstream, method comprising:

identifying transform coefficients associated with an input bitstream;

selecting transform coefficients for filtering to provide modified transform coefficients, wherein the transform coefficients associated with the input bitstream are selected differentially on a per block or a per macroblock basis wherein the method selectively filters fewer transform coefficients in a macroblock according to the number of the macroblock in a frame; and generating an output bitstream, wherein the output bitstream associated with modified transform coefficients uses less bandwidth than the input bitstream associated with the transform coefficients.

9. The method of claim 8, wherein identifying transform coefficients comprises performing variable length decoding on the input bitstream.

10. The method of claim 8, wherein identifying transform coefficients comprises acquiring the transform coefficients from a file.

11. The method of claim 8, wherein identifying transform coefficients comprises performing a DCT operation on video data.

12. The method of claim 8, wherein identifying transform coefficients comprises performing a DCT operation on audio data.

13. The method of claim 8, wherein the transform coefficients are DCT coefficients.

14. The method of claim 8, wherein generating an output bitstream comprises performing variable length coding.

15. The method of claim 8, wherein selecting transform coefficients for filtering comprises identifying a cut-off index.

16. The method of claim 8, wherein selecting transform coefficients for filtering comprises identifying a filter.

17. The method of claim 16, wherein the filter changes on a per block or per macroblock basis.

18. The method of claim 16, wherein the filter comprises threshold values that determine which transform coefficients are filtered.

19. The method of claim 16, wherein the filter is 8×8.

20. The method of claim 16, wherein the filter is a one dimensional array.

21. An apparatus for filtering transform coefficients associated with input bits to provide modified transform coefficients associated with output bits, the apparatus comprising:

an input interface for receiving transform coefficients associated with input bits;

a rate controller that provides rate control information for a block of video data, wherein the rate controller provides information about a number of input and output bits for prior filtered blocks of data to provide the rate control information for the block;

a filtering stage coupled to the input interface, wherein the filtering stage selects transform coefficients for filtering; and an output interface coupled with the filtering stage for providing modified transform coefficients associated with output bits, wherein the number of output bits is less than the number of input bits and the filtering produces a bit rate for the modified transform coefficients that meets a bandwidth constraint, wherein the transform coefficients before filtering does not meet the bandwidth constraint and the modified transform coefficients includes a reduced bit rate that meets the bandwidth constraint.

22. The apparatus of claim 21, wherein the input interface comprises a variable length decoder.

23. The apparatus of claim 21, wherein the input interface reads the transform coefficients from a file.

24. The apparatus of claim 21, wherein the output interfaces comprises a variable length encoder.

25. The apparatus of claim 21, wherein the filtering stage uses a cut-off index.

26. The apparatus of claim 21, wherein the filtering stage uses a filter.

27. The apparatus of claim 26, wherein the filter changes on a per block or per macroblock basis.

28. The apparatus of claim 26, wherein the filter comprises threshold values that determine which transform coefficients are filtered.

29. An apparatus for filtering transform coefficients associated with input bits to provide modified transform coefficients associated with output bits, the apparatus comprising:

an input interface for receiving transform coefficients associated with input bits;

a filtering stage coupled to the input interface, wherein the filtering stage selects transform coefficients for filtering; and an output interface coupled with the filtering stage for providing modified transform coefficients associated with output bits, wherein the number of output bits is less than the number of input bits and The filtering produces a bit rate for the modified transform coefficients that meets a bandwidth constraint, wherein the transform coefficients before filtering does not meet the bandwidth constraint and the modified transform coefficients includes a reduced bit rate that meets the bandwidth constraint, wherein the filtering stage selectively filters fewer transform coefficients for a macroblock according to the number of the macroblock in a frame.

30. A computer readable medium comprising computer code for filtering transform coefficients associated with an input bitstream, the computer readable medium comprising:

computer code for identifying transform coefficients associated with an input bitstream;

computer code for selecting transform coefficients for filtering to provide modified transform coefficients, wherein the transform coefficients associated with the input bitstream are selected differentially on a per block or a per macroblock basis;

computer code for providing rate control information for a block of video data, wherein the rate control information includes a number of input and output bits for prior filtered blocks of data; and computer code for generating an output bitstream, wherein the output bitstream associated with modified transform coefficients uses less bandwidth than the input bitstream associated with the transform coefficients.

31. The computer readable medium of claim 30, wherein identifying transform coefficients comprises performing variable length decoding on the input bitstream.

32. The computer readable medium of claim 30, wherein identifying transform coefficients comprises acquiring the transform coefficients from a file.

33. The computer readable medium of claim 30, wherein identifying transform coefficients comprises performing a DCT operation on video data.

34. The computer readable medium of claim 30, wherein identifying transform coefficients comprises performing a DCT operation on audio data.

35. The computer readable medium of claim 30, wherein the transform coefficients are DCT coefficients.

36. The computer readable medium of claim 30, wherein generating an output bitstream comprises performing variable length coding.

37. The computer readable medium of claim 30, wherein selecting transform coefficients for filtering comprises identifying a cut-off index.

38. The computer readable medium of claim 30, wherein selecting transform coefficients for filtering comprises identifying a filter.

39. An apparatus for reducing the bit rate of a video bitstream to meet bandwidth constraints, the method comprising:

means for identifying transform coefficients representing video content in a frame or a portion of frame of the video bitstream;

means for filtering selected transform, coefficients from the video bitstream to thereby reduce the bit rate of the video bitstream and produce a reduced bit rate for the video bitstream that meets the bandwidth constraint, wherein the video bitstream before filtering does not meet the bandwidth constraint and the video bitstream including the modified transform coefficients includes the reduced bit rate that meets the bandwidth constraint; and means for selectively filtering fewer transform coefficients for a macroblock according to the number of the macroblock in a frame.

40. The apparatus of claim 39, wherein filtering selected transform coefficients comprises using a cut-off index.

41. The apparatus of claim 39, wherein filtering selected transform coefficients comprises using a filter.

42. The apparatus of claim 41, wherein the filter comprises ones and zeros.

43. The apparatus of claim 41, wherein the filter comprises threshold values that determine which transform coefficients are filtered.

44. The apparatus of claim 39 wherein the transform coefficients from the video bitstream are filtered differentially on a per block or a per macroblock basis.

* * * * *